July 12, 1949.　　T. J. LEHANE ET AL　　2,476,199
WEIGHTED AVERAGE TEMPERATURE CONTROL
Filed April 16, 1945　　6 Sheets-Sheet 1

Inventors:
Timothy J. Lehane
Everett H. Burgess
By Harvey M. Gillespie
Attorney

July 12, 1949.  T. J. LEHANE ET AL  2,476,199
WEIGHTED AVERAGE TEMPERATURE CONTROL
Filed April 16, 1945  6 Sheets-Sheet 2

Patented July 12, 1949

2,476,199

UNITED STATES PATENT OFFICE 2,476,199

WEIGHTED AVERAGE TEMPERATURE CONTROL

Timothy J. Lehane and Everett H. Burgess, Chicago, Ill., assignors, by mesne assignments, to Vapor Heating Corporation, a corporation of Delaware Application April 16, 1945, Serial No. 588,610

23 Claims. (Cl. 257—3)

This invention relates to certain new and useful improvements in apparatus for controlling the temperature of a plurality of enclosed spaces.

A principal object of the invention is to provide a temperature control apparatus which will function in an improved manner to control the delivery of heat and/or refrigeration to a group of enclosed spaces in accordance with the temperature requirements of the individual spaces or as an alternative to control the said delivery of heat and/or refrigeration in accordance with the temperature requirements of a predetermined number of enclosures of said group. In this connection the invention contemplates the provision of primary and secondary heating systems which function conjointly to supply heat to the several enclosed spaces for reheating the air to the desired temperature during the cooling function of the system.

Another object is to provide a temperature control apparatus of the above character in which a master control element is automatically adjusted by temperature responsive elements in the several enclosed spaces whereby the master control is caused to function and thereby control the delivery of heat and/or refrigeration to a group of enclosures in response to the cumulative effects thereon from the functioning of a plurality of said temperature responsive elements according to their individual adjustments.

Another object is to provide, in a heating system having primary and secondary heat delivery means for a plurality of enclosed spaces, a control apparatus including a master control element for the group having an auxiliary electric heater therefor, a temperature responsive element in each of the several enclosed spaces and electric resistances associated with said auxiliary heater and with the several temperature responsive elements whereby the functioning of a predetermined number of said temperature responsive elements are effective to add sufficient auxiliary heat to the heater of said master control element to cause it to function in a manner to make the secondary heat delivery means ineffective.

Another object is to provide an improved electric control system for controlling the temperature of a plurality of enclosed spaces by controlling, under certain conditions, the operations of a primary heating apparatus for the several spaces in accordance with the temperatures desired for each of the said spaces and by controlling under certain other conditions the functioning of a secondary heater and an air cooling and circulating means, whereby both heating means are available when desired to deliver heat into said enclosed spaces, and whereby the primary heaters may be used alone for the individual spaces or both the primary and secondary heaters may be used conjointly to reheat the air to the desired temperature during the cooling function of the system. When both the primary and secondary heaters are used to reheat the previously cooled air, the secondary heaters introduce sufficient heat into the air streams to prevent undesirably cool down drafts when the air is introduced into the space, but the major portion of the reheating operation is performed by the primary heaters after the air is introduced into the temperature controlled space.

The impoved control system of the present invention is illustrated in the accompanying drawings wherein.

The electric control system of the present invention is illustrated in the present application in connection with a railway passenger car composed of two groups of rooms arranged along opposite sides of the car. The number of rooms may vary in different cars, this factor being determined by the size of the rooms. In the present application, the room arrangement of the car is such that there are twelve rooms on each side of the car. The rooms composing the group on one side of the car are indicated in the drawings by the reference letter A. The rooms composing the group on the other side of the car are designated by the reference letter B. The heating and cooling apparatus for the two groups of rooms, together with the electric control system therefor, are operable for the most part independently of each other. However, under certain conditions, which will be hereinafter described, the heating means for both groups of rooms are controlled by the same control elements.

General structure

The heating equipment and the controls therefore will be now described in respect to their structure and general function, but without specific reference to the operations produced as a result of the various circuits established from time to time through the several devices. These operations will be pointed out in connection with the description of the specific circuits shown in Figs. 4, 5 and 6 of the drawings.

For the purpose of making the description as brief as possible, the several parts where duplicate elements are used in either or both groups of rooms, will be confined to one such element used in the control system for the rooms of group A.

The several rooms of both groups A and B are provided, respectively, with individual heaters which are herein designated as primary heaters, since their operation determines the temperature maintained in the individual rooms. There is also a general heating system for supplying air heated to various uniform temperatures for delivery to all said rooms of both groups A and B. This system is referred to herein as a secondary heating system, since it functions to reduce the heating load of the individual or primary heaters. The primary heaters are shown herein as floor radiators C—C', but obviously these radiators could have other arrangements, consistent with their functions of determining the temperature of the room with which they are associated. The secondary heating system is preferably an overhead air heating system, but its location can be altered without altering its function. The primary heating system is also available either alone or conjointly with the secondary heating system to reheat the air in one or more rooms to meet special requirements duirng the cooling function of the system when the secondary heaters are ineffective.

Primary heating system

The radiators C—C' of the primary heating system are of identical construction. It will be sufficient, therefore, to describe one radiator C. Each radiator C comprises an outer pipe 10 provided with heat dissipating fins 11 (Fig. 1) thereon. The heating medium is introduced into the radiator from a supply pipe 12 which communicates through valve D with an inner feed pipe 13 of the radiator. The heating medium, for example steam, passes from the inner feed pipe 13 into the outer pipe 10 at the end thereof which is remote from the valve D. The condensation flows rearwardly in the outer pipe 10 and is discharged through drain pipe 14.

Secondary heating system

Figure 1:
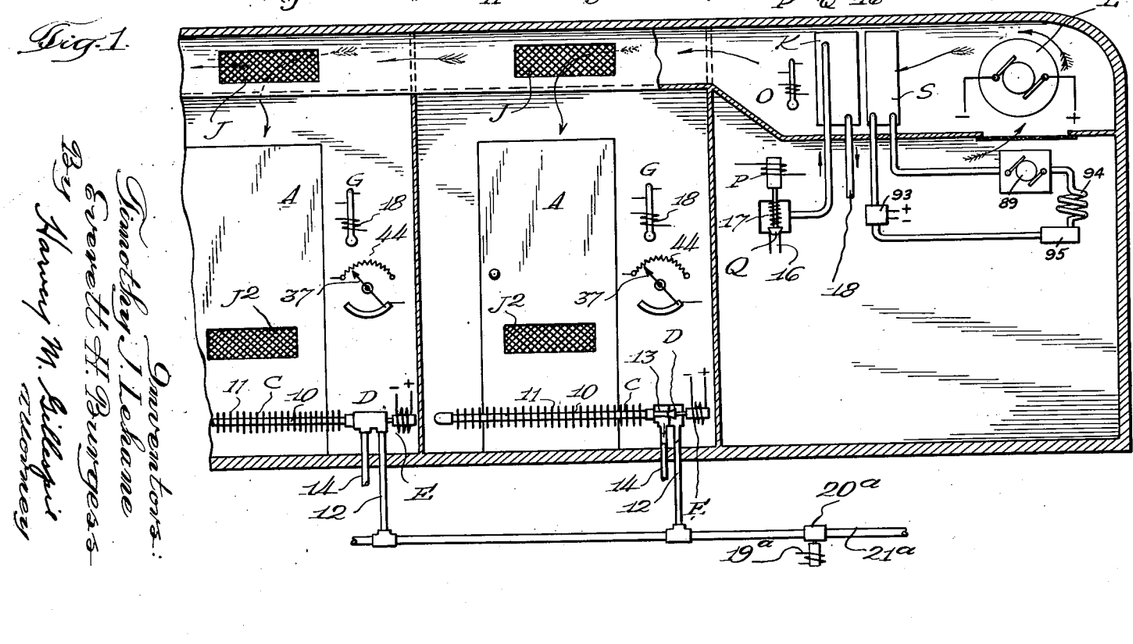
Fig. 1 is a fragmentary sectional view of one end of a railway car equipped with the primary and secondary heating systems in accordance with this invention.
Figure 2:
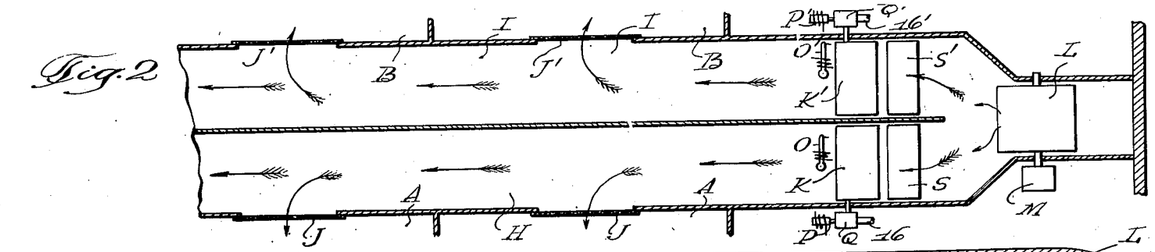
Fig. 2 is a sectional plan illustrating the air delivery ducts of the secondary heating system.

The secondary or overhead heating system includes a pair of ducts H and I (Fig. 2) which extend the full length of the car. The duct H communicates through grills J with each of the rooms in group A. The duct I communicates through grills J' with each of the rooms in group B. Secondary radiators K and K' are arranged in ducts H and I, respectively, at one end of the car and a blower L is positioned to withdraw air through suitable grills $J^2$ from all enclosed spaces of the car and force it through secondary radiators K, K'. Each secondary radiator, for example radiator K, is supplied with heating medium, preferably steam, from a supply pipe 16 which is normally closed by a valve Q. The valve Q (Fig. 1) is normally held in its closed position, for example by a spring 17. The valve is opened against the compression of the spring 17 to admit steam to the secondary radiator K by the energization of a solenoid P. The outlet pipe for condensation from the radiator K is indicated by the reference numeral 18 (Fig. 1).

Blower switch

The blower L, operated by means of an electric motor M, is controlled by a manually operated master switch composed of switch arms $M^1$, $M^2$ $M^3$, $M^4$ and $M^5$. A switch arm designated $M^6$ may be operated as a part of the master switch or it may be separately operated manually. It is interposed in the circuit comprising wires $19^b$, $19^c$, $19^d$ leading through relays N, N' to solenoid $19^a$. When switch $M^6$ is closed, and the relays N—N' are in the positions which they assume when their associated thermostats O—O' call for heat, the said solenoid $19^a$ may be energized by operation of relay X to close the main valve $20^a$. This is done ordinarily during the lay over period of the car when the primary heating system is under the control of thermostat V or W located outside the car. However, when the said switch $M^6$ is open or when either of the relays N—N' are in the positions assumed when their associated thermostats O—O' are satisfied, the energizing circuit for coil $19^a$ is broken and thereby permits the main steam supply valve $20^a$ to open. The purpose of this operation is to insure supply of heating medium to the primary heaters so that these heaters may be utilized in conjunction with the secondary heaters to reheat the circulated air during the cooling function of the system.

Outside thermostat control

The outside thermostat V is preferably set to function at 50° F. By so functioning it deenergizes solenoid 19 of relay X to close an energizing circuit through solenoid $19^a$ and thereby closes the main steam valve $20^a$. The main steam valve $20^a$ is located in a steam supply line $21^a$ leading to the inlet valves D of all floor radiators C. The valve $20^a$ is normally open to permit steam to flow to the inlet valves D of the several floor radiators and is closed by the energization solenoid $19^a$. Consequently, when the outside temperature reaches the functioning temperature of thermostat V (50° F.), the solenoid 19 of relay X is deenergized so as to close an energizing circuit through solenoid $19^a$ and thereby close the main valve $20^a$. The said functioning of the outside thermostat also closes a circuit through outside relay X for energizing actuating solenoids 21—21' of cooler relays Y—Y'. The last mentioned relays condition the actuating circuits through the valves and compressors of coolers S—S' so that the operation of the said coolers can be controlled by the functioning of their associated thermal switches R—R'.

Thermal switches

These thermal switches, one for each group of rooms, are positioned in the car or in the return air duct so as to be influenced by the air temperature. They are also provided with auxiliary heaters 22—22', whereby their functioning temperatures may be varied from time to time in accordance with the temperature conditions existing in a predetermined number of the group of rooms associated with the thermal switches. The manner in which various amounts of heat are delivered to the auxiliary heaters of the thermal switches will be hereinafter described in connection with the description of the circuits. However, it may be pointed out now, without reference to the specific control circuits, that when the temperature of the thermal switches R—R' are such as to cause their mercury columns to engage contacts 23—23', either or both, coolers S—S', as the case may be, are caused to function simultaneously with the conjoint operation of the primary radiators C—C' and secondary radiators K—K' so as to cool and thereafter reheat the air to the temperature desired to be maintained in the several rooms. It will be here observed that the heat supplied to the cooled air will be uniform for all rooms and will be sufficient to prevent undesirably cool down drafts. The principal reheating of the cooled air is performed by the primary heaters after the air enters the space or room. In this way the temperature of the individual rooms may be maintained in accordance with the wishes of the occupants thereof.

The duct thermostats O—O' are preferably positioned in the air delivery ducts H and I. Consequently, they will be normally influenced by the lowering of the air duct temperature due to the operation of coolers S—S'. However, any effect which the lowered duct temperature might normally have to increase the heat output from secondary radiators K—K' is offset by adding heat to the auxiliary heaters 24—24'. The additional heating current is supplied to said auxiliary heaters by the collective action of the weighted average resistors 76—76' associated with the room thermostat relays F—F' and serves to reduce the settings of thermostats O—O' so as to harmonize with the reduced temperature of the air delivery ducts.

When the room thermostats G—G' of a predetermined number of rooms are satisfied, the weighted average resistors 76—76', associated with said thermostats, will supply sufficient heating current to the auxiliary heaters 22—22' of the thermal switches R—R' to move their mercury columns into engagement with the contacts 23—23'. When this occurs, the cooled air from coolers S—S' may be reheated, as previously described, by intermittent conjoint operations of the primary radiators C—C' and the secondary radiators K—K'. If the said switch is open, or if either of the relays N—N' are positioned to open the circuit through the solenoid 19ª, the main steam valve 20ª is open. Consequently, the primary radiators C—C' are effective, either alone or conjointly with the secondary heaters K—K', to add heat to the air introduced into the rooms to maintain the temperature of the room in accordance with the setting of the room thermostat. If the temperature of the thermal switches R—R' continue to rise until their mercury columns are caused to engage the outer contacts 25—25', the secondary radiators are made ineffective by reason of the fact that the circuit closed through contacts 25—25' results in deenergizing solenoid 20—20' of relays N—N' and consequently deenergizes the valve solenoids P—P' of the secondary radiators.

Wattage control

In addition to the above control elements, the improved control system includes a wattage regulator adapted to maintain the various auxiliary heaters at their predetermined temperatures in the event that the electric current delivered should, for any reason, increase above a predetermined voltage. The various auxiliary heaters of the present invention are proportioned in relation to an electric source of predetermined voltage. When excessive voltage is delivered by such source to any one or more of said auxiliary heaters, the wattage regulator functions to open the auxiliary heater circuit momentarily so that it will be heated to only its desired temperature. Said wattage regulator includes a thermostat 26, an auxiliary heater 27 therefor, and a relay 28 controlled by said thermostat 26. During the normal operation of the system, the mercury column of thermostat 26 is maintained close to the outer contact 29 thereof by means of a heater circuit leading from closed blower switch arm $M^2$, wires 50 and 51, heater coil 27, wire 48, contacts 31 and 32 of wattage relay and wire 49 to negative line 36. By reason of the cycling action of wattage thermostat 26, the movable contact 30 of the wattage relay will be continuously moved into and out of engagement with its fixed contacts 31—32 and thereby makes and breaks all auxiliary heater circuits intermittently in rapid succession.

Initial heat-up control circuits

Figure 6:
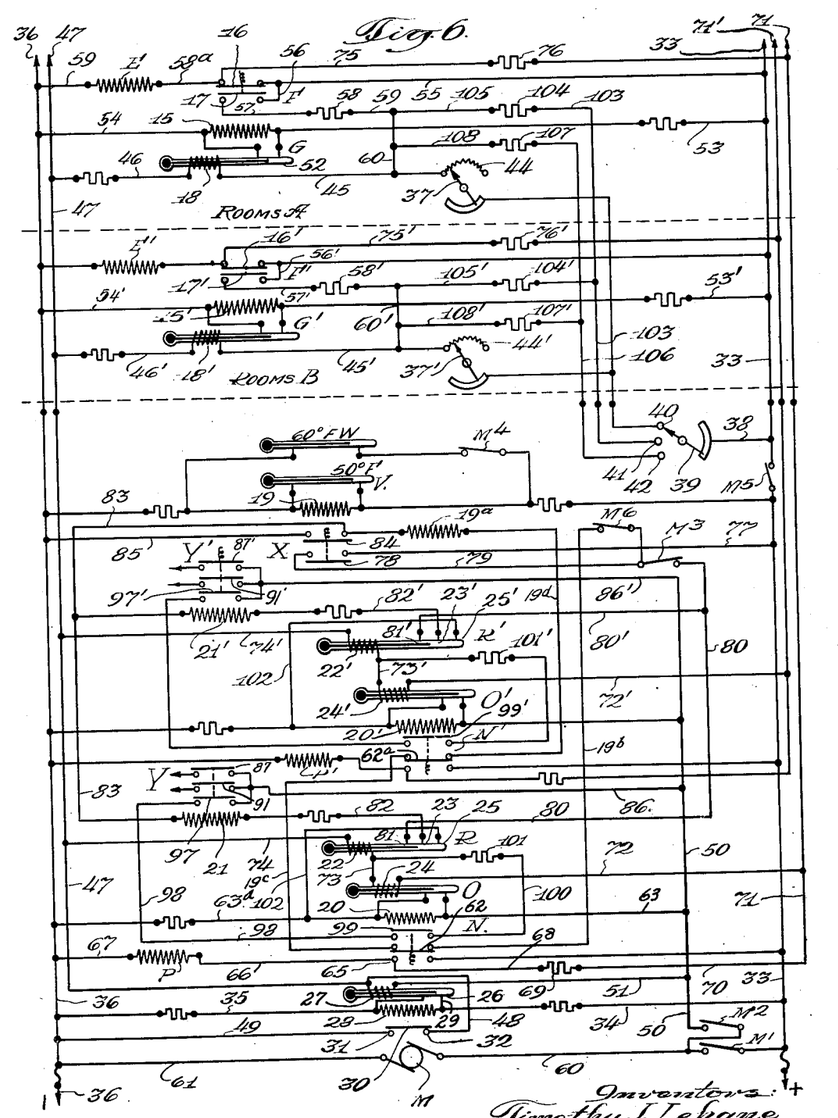
Fig. 6 is a complete wiring diagram of the control system.

Referring now to the control circuit shown in Fig. 6: The various control devices are shown in the positions which they will normally assume when the temperature outside the car is below the functional setting of outside thermostat V (50° F.) and the temperature inside the car is below the temperature, for example 60° F., at which the inside lay-over thermostat W is normally set to function. When these conditions exist, all primary radiators C—C' of both groups of rooms are controlled by the thermostat relay X. This relay may be controlled by either of the thermostats V or W, depending upon which of the two thermostats is caused to function. The inside or lay-over thermostat W will ordinarily take control since the inside temperature of the car is maintained near the temperature of 60° F. during inactive or lay-over periods of the car.

During the initial heat-up of the car, one of the first circuits to be closed leads from positive line 33 through lead branch 34 to solenoid 28 of wattage relay and thence to the negative line 36. The energization of solenoid 28 will hold relay movable contact 30 against fixed contacts 31—32. Inasmuch as the steam supply to the radiators during such assumed lay-over is controlled by one of the thermostats V or W, there are no auxiliary heaters made effective. Consequently, the wattage regulator functions merely to condition the circuits of all auxiliary heaters so that they will function when the primary radiators are controlled by the room thermostats G—G'.

Room thermostat control circuits

When the car is put into service, the blower switch is positioned to open switch arm $M^4$, so as to make inside thermostat W ineffective, to close switch arms M¹, M², M³ and M⁵ so as to put the primary radiators C for group A rooms under the automatic control of the room thermostats G and to put the primary radiators C' of group B rooms under the control of room thermostats G'. The said closing of the blower switch also puts the secondary radiators K—K' under the automatic control of duct thermostats O—O'.

During the initial automatic heat-up of the rooms both the primary and the secondary radiators are effective (the valves of the primary radiators being normally open) to deliver heat into the rooms until the temperature of the rooms plus the auxiliary heat applied to the room thermostats cause them to function and thereby shut off the primary radiators under their individual control. The functioning temperature of each room thermostat can be selectively controlled by the occupant of the room to function at any suitable temperature desired. This selective setting has direct control of only the individual room thermostat and consequently the heat output of the individual primary radiator. However, the selective control of the individual primary radiator makes it possible for the occupants of the several rooms to enjoy a temperature of their individual selection, since the amount of heat delivered by primary heaters C or C' may be so varied that the combined amounts of heat delivered to a space by the primary and secondary heaters will maintain the space at a temperature corresponding to the setting of the room thermostat. For example, assuming that an occupant of one room of group A desires a room temperature of 65° F., he will turn the potentiometer arm 37 to a position to indicate that temperature setting. If an occupant of another room of group A should desire a temperature setting of 80° F., he will move the potentiometer arm 37 of his room thermostat to the 80° position. Both occupants will enjoy the temperatures selected by them. Inasmuch as the amount of heat delivered by the secondary heater is uniform in all rooms, the lower and higher temperatures of the respective rooms are obtained, as above indicated, by controlling the amount of heat delivered by the respective primary radiators in the separate rooms.

*Variable setting of room thermostat*

Figure 3:
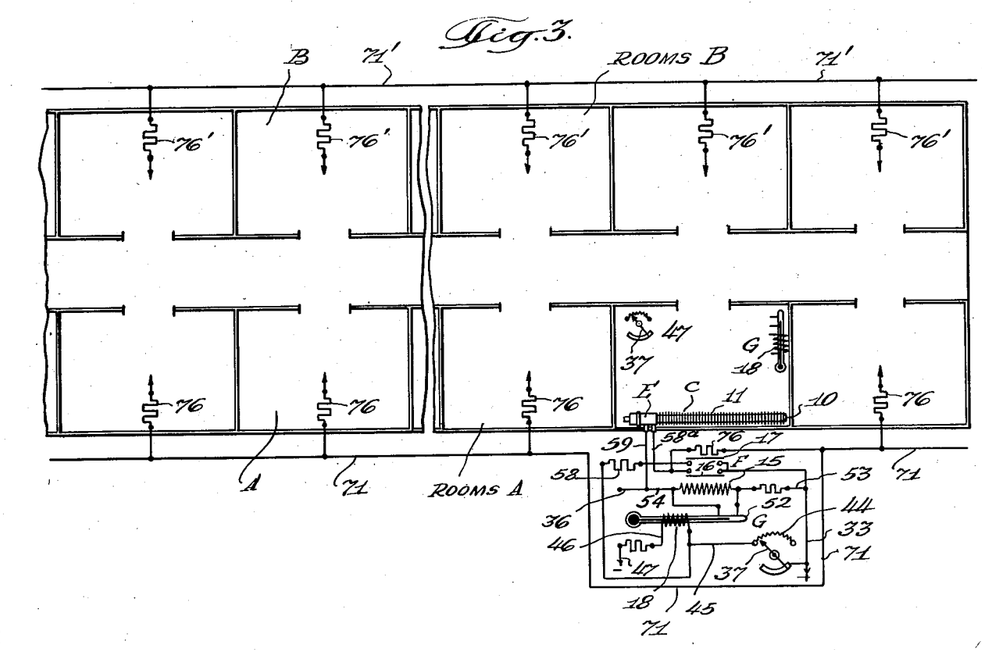
Fig. 3 is a diagrammatic illustration of the room arrangements of the car and showing part of the electrical control system for the primary radiators.
Figure 4:
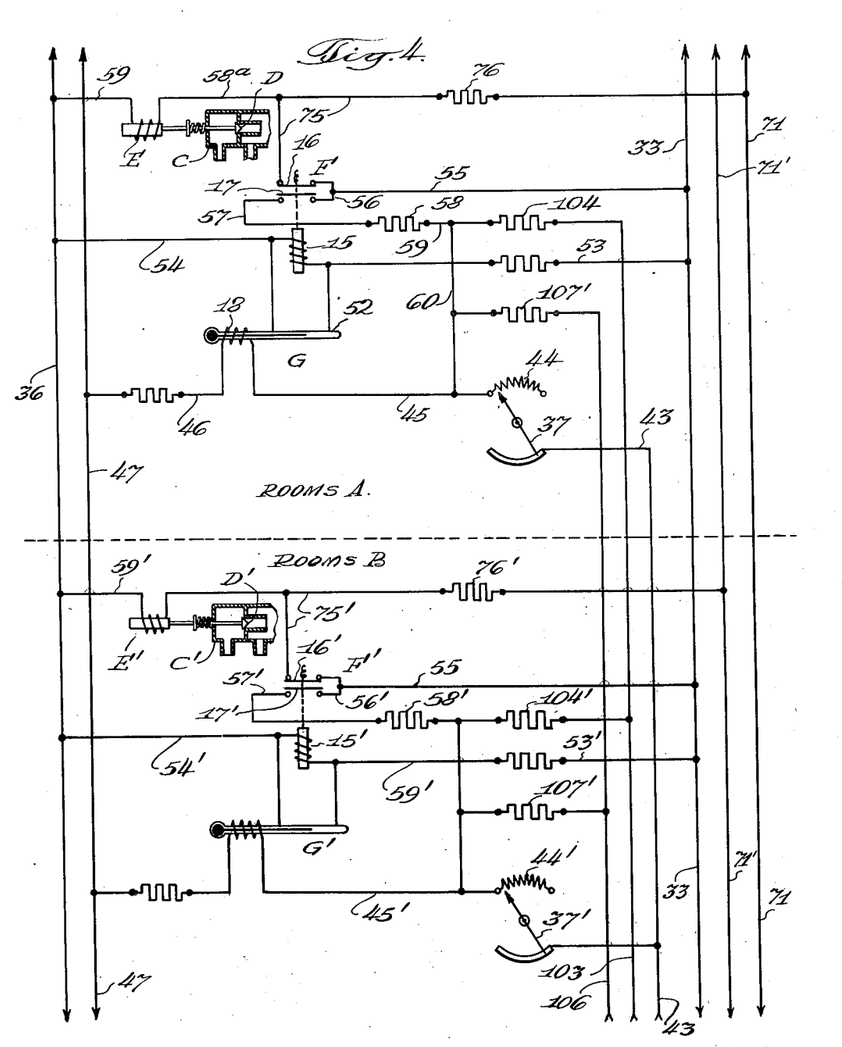
Fig. 4 is a detailed diagrammatic arrangement of certain of the thermostats and relays forming a part of the electrical control system.
Figure 5:
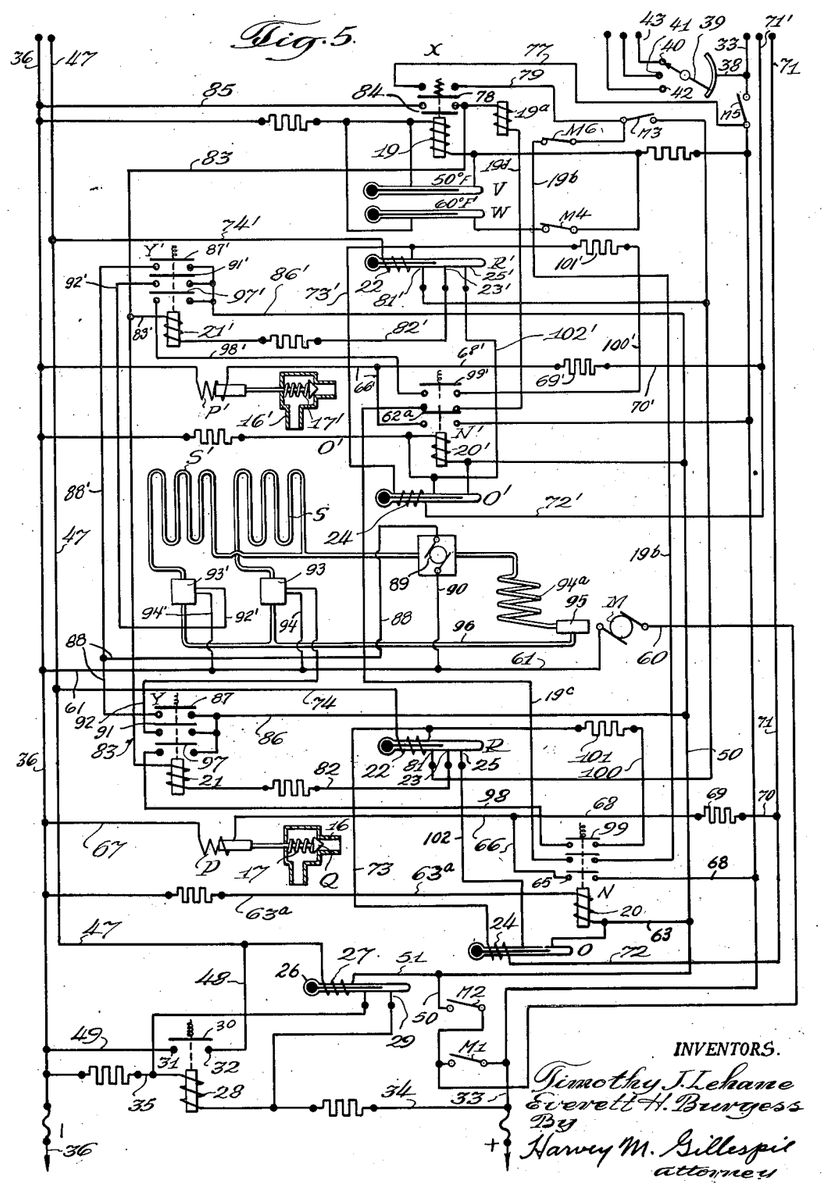
Fig. 5 illustrates the arrangement of the cooling coils together with the thermostats and relays for controlling the operation of the cooling mechanism and the cooperative thermostats and relays for controlling the operation of the secondary radiators.

The electric circuit for setting the room thermostats of group A rooms leads from switch M⁵ in the positive line 33 through lead 38 to a three position switch arm 39 adapted to close alternative circuits through contacts 40, 41 and 42. The contact 40 connects the circuit through wire 43 with the movable arm 37 and variable resistance 44 of a potentiometer for varying the supply of current to the auxiliary heater 18 of the associated room thermostat G. The said heater circuit is completed through wire 45 leading from the resistance 44 to the auxiliary heater and thence through wires 46, 47 and 48 to movable contact 30 of wattage relay and thence through wire 49 to the negative line 36. So long as the mercury column of thermostat G remains spaced from its outer contact 52, an energizing circuit is established through solenoid 15 of relay F. This circuit leads from positive line 33 through wire 53 to solenoid 15 and returns through wire 54 to the negative line 36 (Figs. 3, 4 and 6). The energization of solenoid 15 moves the arm 17 of relay F into a position to close a circuit for supplying additional heat to auxiliary heater 18 of thermostat G and thereby accelerates the functioning of said thermostat. This additional heating circuit leads from positive line 33 through wires 55 and 56, closed relay contact 17, wire 57, cycle resistor 58, and wires 59 and 60 to wire 45 of the permanent heater circuit.

The additional heating circuit above described will be made and broken at frequent intervals until the temperature of the room plus the auxiliary heat is sufficient to hold the mercury column of the thermostat engaged with the outer contact 52. Each time the mercury column engages the outer contact 52, the relay F is deenergized and thereby moves its contact 16 into a position to close an energizing circuit through solenoid E to close the inlet valve D of its associated primary radiator C. This circuit leads from positive line 33 through wire 55, closed relay contact 16, wires 75 and 58ª, solenoid E and wire 59 to the negative line 36.

*Secondary radiator control*

The secondary radiators K—K' operate to supply heated air to the rooms to supplement the heat output from the primary radiators C—C'. The said secondary radiators are made effective by the closing of the blower switches M¹ and M². The switch arm M¹ closes an energizing circuit through the blower motor M, so as to force air through both heaters K—K' and into all rooms of both groups. The motor circuit leads from positive line 33, switch arm M¹, wire 60, motor M and thence through wire 61 to the negative line 36.

The closing of the blower switch M² establishes an energizing circuit for relays N—N', for example solenoid 20 of relay N, the latter of which when de-energized, operates to close an energizing circuit through solenoid P to open inlet valve Q (Fig. 5) of the secondary heater K and to also break the circuit through the main valve solenoid 19ª (Figs. 1 and 6) at contacts 62—62ª of said relays N—N', respectively. In this way the main valve 20ª (Fig. 1) will be opened so that the primary radiators can be made effective if the temperature of the room requires heat from the primary radiators. The circuit for relay solenoid 20 of relay N leads from wire 50 through wire 63 to solenoid 20, and thence through wire 63ª to the negative line 36. The circuit for valve solenoid P (Figs. 5 and 6) leads from negative line 33 through wire 68, closed relay contact 62—65, wire 66, solenoid P and thence through wire 67 to negative line 36. Upon the closing of relay contact 65 and consequent opening of the inlet steam valve Q for the secondary radiator K, a heater circuit is established through the auxiliary heater 24 of the duct thermostat O so as to produce a cycling action of the thermostat. This heating circuit leads from the closed contact 65 of relay N through wire 68, cycle resistor 69, and wires 70, 71 and 72 to auxiliary heater 24 of thermostat O, thence through wire 73 to heater 22 of thermal switch R and back to the negative line 36 through wires 74, 47, 48 and 49. The cycling action of thermostat O effects intermittent operation of the relay N and therefore opens and closes the steam inlet valve Q repeatedly to feed the steam into the secondary radiator K in a series of bursts of varying duration until the temperature of the air supplied to the room plus the added heat to the thermal switch R is sufficient to maintain its mercury column in contact with both contacts 23—25. This condition is influenced by the weighted average control circuits which are closed by the various relays F when the room thermostats and relays function to shut off the heat to the primary radiators C.

Weighted average control circuits

There is a weighted average control circuit leading from each room thermostat relay F of a group of rooms, for example group A (Fig. 1), to the auxiliary heaters for duct thermostat O and the thermal switch R associated with said group of rooms. The said circuits are termed "weighted average control circuits," since they are connected in parallel and produce a cumulative effect on the duct thermostat O and its associated thermal switch R. Inasmuch as the room thermostats G of a group of rooms will be ordinarily set to function at different temperatures, the said thermostat O and the associated thermal switch R will be influenced in their operation by the average temperature setting of the closed thermostats G arranged in group A rooms of the car.

The weighted average circuits are identical for all rooms of group A. In each case they lead from closed contact 16 of relay F (Fig. 1) through wire 75, weighted average resistor 76, to wire 71, which is common for all relays F, thence through wire 72, heater 24, wire 73, heater 22, and wires 74, 47, 48 and 49 to the negative line 36.

Functioning of weighted average control when outside thermostat V is open

The number of room thermostats and the temperatures at which these thermostats are set to function may vary in different installations. However, in order to provide one example of the means in which the weighted average control circuits function, let it be assumed that the outside temperature is below 50° F., that the thermostat O is set to normally function at 76° F., and that six of the room thermostats F are set to function at 70° F., three are set to function at 65° F., and three are set to function at 80° F. It will also be assumed that 1° of heat is added to the duct thermostat O, by virtue of the resistor 76, for each room thermostat F that becomes satisfied and closes its contact. So long as all room thermostats call for heat, the primary radiator C will function to deliver heat into the room and the secondary radiator K will deliver heated air into all the rooms at a temperature slightly below the temperature at which the duct thermostats O are set to function. Now if the thermostat in one of the 65° rooms is caused to close its contacts, its primary radiator C will be closed by the energization of the associated valve solenoid E. The functioning of the one 65° room thermostat will add one degree of heat to the duct thermostat O and thereby reduce its functional temperature to 75° F. When another 65° room thermostat is caused to close its contacts, another degree of heat is added to said duct thermostat O to reduce its functional setting to 74° F. If the temperature in the air delivery duct H has risen to a temperature of 74°, the valve Q of the secondary radiator K will be closed until the duct temperature falls below 74° F. or until the temperature in one of the 65° rooms falls below 65°. Whenever the duct temperature declines below 74°, the steam inlet valve Q of the secondary radiator will be opened to maintain the duct temperature at 74°. However, if the temperature of one of the 65° rooms should cool sufficiently to open its contacts, the thermostat relay and steam supply valve will operate to admit steam to the primary radiator C of that room, and the associated weighted average circuit will be opened at the relay F and thereby remove one degree of heat from the duct thermostat O. As a result of this condition, the temperature of air duct H will raise one degree to 75° F. Such on and off cycling action of the twelve primary radiators C and of the secondary radiator K will continue until all room thermostats have been satisfied. When this condition occurs, there will be a total of 12° of heat added to the duct thermostat O, due to the current supplied through the twelve weighted average resistors 76. This additional 12° of heat on the duct thermostat reduces its functional setting to 64° F.

Functioning of weighted average control when outside thermostat V is closed

When the outside temperature is below the functional setting of the outside thermostat V, the relay X, as previously indicated, is energized to open its contacts and thereby permit steam to flow through the main valve 20ᵃ (Fig. 1) to the primary radiator valves D. During such conditions the cooling mechanism remains inoperative. However, when the outside temperature rises above the functional setting of said outside thermostat V, for example 50° F., the solenoid 19 is deenergized so as to permit the relay X to close its contacts and thereby so condition the various other circuits that the cooling mechanism can be made effective. If the switch M⁶ is opened, the primary radiator D will function in the manner previously described to reheat the air delivered into the rooms regardless of the operation of the secondary heaters. In this way the air delivered to the respective rooms may be reheated to meet special conditions even though the system as a whole is set to operate for cooling only. However, if the switch M⁶ and relays N—N' are in the positions shown in Fig. 6, the control circuits for the secondary radiator K remain effective so that the secondary radiator K and the cooler S may function together to maintain the desired temperature in the entire group of rooms A. The circuit for making the cooling apparatus effective leads from positive line 33 through wire 77, contact 78 of relay X, wire 79, blower switch M³, wire 80 to contact 81 of thermal switch R. If the temperature of the car, plus the heat added by auxiliary heater 22 is sufficient to raise the mercury column of thermal switch R to engage with contact 23 thereof, the circuit is completed through wire 82, solenoid 21 of cooler relay Y, wire 83 through closed contact 84 of relay X, and thence through wire 85 to the negative line 36. This circuit energizes the relay Y so as to close its contacts and thereby direct electric current from positive branch 50 through wire 86, contact 87 of relay Y, wire 88 to compressor motor 89 (Fig. 5), thence through wires 90 and 61 to negative line 36 so as to start operation of the compressor 89. Simultaneously with the energization of the compressor motor 89, a circuit is established leading from wire 86, through closed contact 91 of relay Y, wire 92 to solenoid valve 93, controlling the inlet cooler S and thence through wires 94 and 61 to the negative line 47. With the compressor 89 operating and the valve 93 open, a suitable coolant fluid is passed through cooler S to the condenser 94ᵃ and into the receiving chamber 95 and supply line 96. The closing of the cooler relay Y also closes a circuit for adding additional heat to the auxiliary heater of the thermal switch R. This circuit leads from said wire 86 through closed contact 97, through wire 98 to the relay N. If the duct thermostat O is open so as to energize relay N, the said heating circuit is continued through closed contact 99 of relay N, wire 100, cycle resistor 101 to auxiliary heaters 22 of thermal switch R, thence through wires 74, 47, 48, closed contact 30 of wattage regulator, and wire 49 to the negative line 36. This additional heat will be sufficient to hold the mercury column of thermal switch R at some point between the contacts 23 and 25 thereof unless there is a pronounced drop in the temperature of the car. When the mercury column of thermal switch R stands at contact 23 or between the contact and the outer contact 25, the secondary radiator K is effective to partially reheat the cooled air delivered to the rooms. However, when the mercury column of said thermal switch R engages the contact 25, the solenoid 20 of the secondary radiator relay N is short-circuited by reason of wire 102 which leads from said thermal switch contact 25 to the negative side of solenoid 20, and thereby deenergizes the relay N and makes the secondary radiator K ineffective, and cooled air only is delivered into the several rooms of group A. However, it is possible, as previously pointed out, to open switch M⁶ and thereby make the primary heaters C—C' of the individual rooms available for reheating the air.

Whenever it is desirable to maintain the car during the day at a cooler temperature, or during the night at a cooler temperature, the switch 39 may be positioned to engage the contacts 41 and 42, respectively. When the switch 39 engages the contact 41, the room thermostats G are supplied with current through wires 103, cycle resistor 104, wires 105, 60 and 45 to the auxiliary heater 18 and thence through wires 46, 47, 48, wattage regulator contact 30, and wire 49 to the negative line 36. With the above circuit closed, the thermostat G will be adjusted to function at a lower temperature and thereby maintain the room with which it is associated somewhat cooler than it would otherwise be maintained by the adjustment of the room potentiometer 37. When the said manual switch 39 is positioned to engage the contact 42 so as to maintain a lower temperature during the night, additional heating current is directed through wire 106, cycle resistor 107, wires 108, 60 and 45 to the auxiliary heater 18, and thence through wires 46, 47, 48, wattage regulator contact 30 and wire 49 to the negative line 36.

Figure 7:
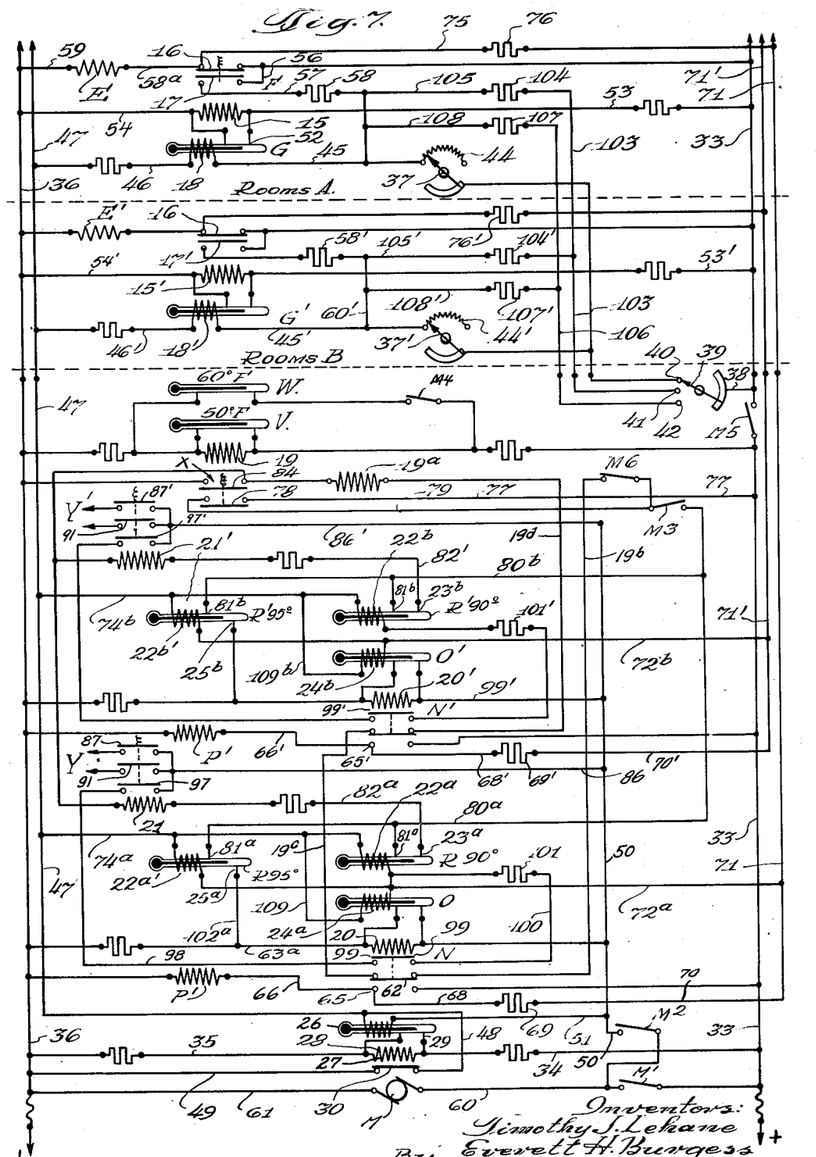
Fig. 7 is a wiring diagram similar to that illustrated in Fig. 6, but slightly modified to accommodate a plurality of thermal switches connected in parallel with each other.

Referring to the modified wiring shown in Fig. 7 of the drawings in which a pair of thermal switches is substituted for each of the thermal switches R, R' shown in Fig. 6. The pairs of thermal switches are used in place of the single switches of the previous embodiment so that the contacts can be arranged farther apart and so that the auxiliary heaters for the duct thermostat O and for each of the thermal switches may be connected in parallel and thereby make it practicable, in a low voltage system, to carry a larger current on the lead wires 71 and thereby avoid the effects of current leakage from the said lead wires 71. In Fig. 7 the pair of thermal switches designated R90° and R95° are associated with the duct thermostat O and control the cooling of the private rooms along one side of the car and the pair of thermal switches designated R'90° and R'95° are associated with the thermostat O' and control the cooling of the private rooms along the other side of the car. Each pair of thermal switches are of identical construction and are connected in the main circuit in the same general manner. For example, the lead wire 80ᵃ, corresponding to wire 80 of Fig. 6, leads to the lower contact of each of the thermal switches R90° and R95°. The upper contact designated 23ᵃ of thermal switch R90° is connected by wire 82ᵃ to solenoid 21 of the relay Y for controlling the operation of the cooling apparatus. When the temperature of the car is such as to cause the mercury column of thermal switch R90° to close at the contact 23ᵃ, the cooling apparatus is set into operation in the manner previously described in connection with Figs. 1 to 6, inclusive. If the temperature of the rooms associated with the thermostats R90° and R95° continues to rise until the mercury column of R95° thermal switch engages the outer contact 25ᵃ thereof, a circuit is closed through wire 80ᵃ corresponding to the wire 80 of the previous embodiment through a thermal switch R95° and wire 102ᵃ to wire 63ᵃ, and thence to the negative line 47 so as to deenergize the relay N and thereby make the heating apparatus K ineffective to add heat to the circulated air. The thermostat O and each of the thermal switches R90° and R95° are provided with auxiliary heaters designated 24ᵃ, 22ᵃ and 22ᵃ', respectively. All of these heaters are connected in parallel and supplied with current through wire 72ᵃ leading from the supply lead 71 which serves as a trunk connection between the several resistors 76 and the said auxiliary heaters of thermostat O and the thermal switches R90° and R95°.

Except for the fact that the auxiliary heaters of said elements are connected in parallel instead of in series, as shown in Fig. 6, the operation of the modified control circuits will be the same as that disclosed in Fig. 6.

*Summary of operation*

This summary is made with reference particularly to Figs. 1 to 6, inclusive, of the drawings, but will be applicable in general to the modified wiring shown in Fig. 7, except in the respects mentioned in the previous paragraph.

When the car is out of active service, the outside thermostat V and the inside lay-over thermostat W have selective control of the primary radiators. The lay-over thermostat W will function at a temperature of 60° F. to close the main steam supply valve 20ᵃ. If the outside temperature rises above 50° F., the outside thermostat V will function and thereby permit the closing of said main steam supply valve 20ᵃ.

Assuming that the outside temperature is below 50° F. and that the blower switch is closed, the switch arm M⁴ of the said switch is opened and the various other arms thereof are closed and thereby puts the primary and the secondary heating systems under the cooperative automatic control of the room thermostats G and the duct thermostat O. When the mercury of a room thermostat G engages its contact 52, the associated relay F moves to a position to deenergize valve solenoid E to permit the valve to close and simultaneously directs electric current through one weighted average resistor 76 to add approximately one degree of heat to the duct thermostat O and to the thermal switch R. This additional heat to the thermal switch R has no present effect, since this device does not become effective until the outside temperature rises above 50° F. However, the added heat to the duct thermostat O does have effect, since the functioning of a sufficient number of room thermostats G and the consequent closing of an equal number of circuits through the parallel weighted average resistors 76, will have a cumulative effect on the duct thermostat O and thereby cause its mercury column to engage the outer contact of the thermostat and thereby deenergize and close the steam supply valve Q to the secondary radiator. This closing may be only temporary during the cycling action of the thermostat O until the temperature in a predetermined number of rooms cause a plurality of room thermostats G to function and thereby close electric current through a sufficient number of parallel weighted average resistors 76 to supply sufficient heat to thermostat O to retain its mercury column in engagement with its outer contact. It is possible for this condition to prevail, even though the outside temperature is below 50° F., the functioning temperature of outside thermostat V, but it will prevail more often when the outside temperature is above said 50° F. In the latter event, the functioning of the outside thermostat V, assuming that switch M⁶ is open, shuts off the steam to all floor radiators C and conditions the control circuit to the cooler S, whereby both the secondary radiator K and the cooler S may cooperate to maintain the group A rooms at a suitable temperature. This cooperative operation of the secondary radiator K and the cooler S will continue so long as the blower fan is closed and the outside temperature remains above 50° F. In other words, the cooler S may operate alone or conjointly with the secondary radiator K while the mercury column of thermal switch R remains between contacts 23 and 25. During this time additional heating current will be added to the thermal switch through cycle resistor 101 each time the relay N is actuated, by the functioning of thermostat O, to close a circuit through solenoid P to open the steam supply valve to radiator K. In this way the mercury column of thermal switch R plus the heat added to the switch is sufficient to cause its mercury column to engage contact 25, a shunt circuit is closed from said contact 25 to the negative side of relay solenoid 19, thereby permitting the relay N to open the circuit through steam valve solenoid P and thereby close the steam supply valve Q for the overhead radiator K. When the mercury column of thermal switch R initially engages the contact 25, it will self-cycle to make the overhead heater effective to reheat the cooled air. However, as the temperature of the car increases, the contact will remain closed so that cooled air only will be delivered into the car rooms of group A.

The heating, reheating and the cooling functions of the present invention have been described, for the most part of the specification, in connection with the group of rooms designated A. However, there are corresponding control circuits, thermostats and relays for controlling the temperature of the group of rooms designated B. These various circuits, thermostats and relays have, therefore, been given the same reference characters, with the addition of a prime exponent, as those used in connection with the corresponding elements for the group A rooms.

We claim:

1. In combination with means for altering the temperature of the air within an enclosed space including an apparatus for directly adding heat to the air within the space, an inlet valve for controlling the passage of heating medium into said apparatus, a main supply valve for controlling the flow of heating medium to said inlet valve, means for controlling the functioning of said apparatus comprising a thermostat set to function at a predetermined outside temperature for controlling the opening and closing of said main supply valve, a thermostat connected in parallel with the first mentioned thermostat and set to function at a predetermined inside temperature to selectively control the opening and closing of said main supply valve, whereby the first thermostat to function will control the operation of said apparatus, a thermostat responsive to the temperature within the space for controlling the operation of the inlet valve, and switch means for rendering the second mentioned thermostat and the last mentioned thermostat alternatively ineffective.

2. In combination with means for altering the temperature of the air within an enclosed space including an apparatus for directly adding heat to the air within the space, an inlet valve for controlling the passage of heating medium into said apparatus, a main supply valve for controlling the flow of heating medium to said inlet valve, means for controlling the functioning of said apparatus comprising a thermostat set to function at a predetermined outside temperature for controlling the opening and closing of said main supply valve, a thermostat connected in parallel with the first mentioned thermostat and set to function at a predetermined inside temperature to selectively control the opening and closing of said main supply valve, whereby the first thermostat to function will control the operation of said apparatus, a thermostat responsive to the temperature within the space for controlling the operation of said inlet valve, means for varying the functional setting of the last mentioned thermostat, and switch means for rendering the second mentioned thermostat and the last mentioned thermostat alternatively ineffective.

3. In combination with means for altering the temperature of the air within an enclosed space including an apparatus for directly adding heat to the air within the space, an inlet valve for controlling the passage of heating medium into said apparatus, a main supply valve for controlling the flow of heating medium to said inlet valve, means for controlling the functioning of said apparatus comprising a thermostat set to function at a predetermined outside temperature for controlling the opening and closing of said main supply valve, a thermostat connected in parallel with the first mentioned thermostat and set to function at a predetermined inside temperature to selectively control the opening and closing of said main supply valve, whereby the first thermostat to function will control the operation of said apparatus, a thermostat responsive to the temperature within the space for controlling the operation of said inlet valve, an auxiliary electric heater for the last mentioned thermostat, a variable resistance in the heating circuit of said auxiliary heater, whereby the thermostat may be set to function at various room temperatures, and switch means for rendering the second mentioned thermostat and the last mentioned thermostat alternatively ineffective.

4. In combination with means for altering the temperature of the air within an enclosed space including apparatus for directly adding heat to the air within the space, means for circulating air through the space and apparatus for heating the circulated air; a thermostat responsive to temperature changes within the space for selectively controlling the first mentioned apparatus, a thermostat responsive to the temperature of the circulated air for controlling the second mentioned apparatus and provided with an auxiliary heater, and means actuated by the functioning of the first mentioned thermostat for closing a heating circuit through said auxiliary heater, whereby said second thermostat is adjusted to function at a lower temperature.

5. In combination with means for altering the temperature of the air within an enclosed space including apparatus for directly adding heat to the air within the space, means for circulating air through the space and apparatus for heating the circulated air; a thermostat responsive to temperature changes within the space for selectively controlling the first mentioned apparatus, a thermostat responsive to the temperature of the circulated air for controlling the second mentioned apparatus and provided with an auxiliary heater, means actuated by the functioning of the first mentioned thermostat for closing a heating circuit through said auxiliary heater, whereby said second thermostat is adjusted to function at a lower temperature, an auxiliary heater for the first mentioned thermostat, and a manually variable resistance for varying the amount of heating current supplied to the heater for the first mentioned thermostat.

6. In combination with means for altering the temperature of the air within an enclosed space including a primary heating apparatus for directly adding heat to the air within the space, means for circulating air through the space and a secondary heating apparatus for heating the circulated air; a thermostat responsive to temperature changes within the space for selectively controlling the primary heating apparatus, a thermostat responsive to the temperature of the circulated air for controlling the secondary heating apparatus and provided with an auxiliary heater, means actuated by the functioning of the first mentioned thermostat for closing a heating circuit through said auxiliary heater, whereby said second thermostat is adjusted to function at a lower temperature, means comprising an outside thermostat set to function at a predetermined outside temperature and effective under certain conditions to control the primary heating apparatus, and means controlled by said second thermostat for rendering said outside thermostat ineffective to control operations of said primary heating apparatus.

7. In combination with means for altering the temperature of the air within an enclosed space including apparatus for directly adding heat to the air within the space, means for circulating air through the space and apparatus for heating the circulated air; a thermostat responsive to temperature changes within the space for selectively controlling the first mentioned apparatus, a thermostat responsive to the temperature of the circulated air for controlling the second mentioned apparatus and provided with an auxiliary heater, means actuated by the functioning of the first mentioned thermostat for closing a heating circuit through said auxiliary heater, whereby said second thermostat is adjusted to function at a lower temperature, an auxiliary heater for the first mentioned thermostat, and a relay actuated by the functioning of said first mentioned thermostat and adapted in one position to direct additional heating current through the auxiliary heater of the first mentioned thermostat.

8. In combination with means for altering the temperature of the air within a plurality of enclosed spaces including separate radiators for each of the spaces, means for circulating air through all of the spaces, and means for heating the circulated air; a thermostat in each space for controlling the admission of a heating medium to the radiator for that space; a thermostat responsive to the temperature of the circulated air for controlling the admission of a heating medium to the means for heating said circulated air; auxiliary heater for the last mentioned thermostat; and means actuated by the functioning of each of the thermostats in said spaces and adapted in one position to direct heating current of predetermined value through said auxiliary heater, whereby the thermostat for controlling the means for heating the circulated air is adjusted to function at lower air temperature by the functioning of a plurality of said space thermostats.

9. In combination with means for altering the temperature of the air within a plurality of enclosed spaces including separate radiators for each of the spaces, means for circulating air through all of the spaces, means for cooling the circulated air, and means for heating the circulated air; a thermostat in each space for controlling the admission of a heating medium to the radiator for that space; a thermostat responsive to the temperature of the circulated air for controlling the admission of a heating medium to the means for heating said circulated air; auxiliary heater for the last mentioned thermostat; a thermal switch for controlling the operation of said cooling means and having an auxiliary heater, means actuated by the functioning of each of the thermostats in said spaces and adapted in one position to direct heating current of predetermined value through both said auxiliary heaters, whereby the thermostat for controlling the means for heating the circulated air and the thermal switch are adjusted to function by the functioning of a plurality of said space thermostats.

10. In combination with means for altering the temperature of the air within a plurality of enclosed spaces including separate radiators for each of the spaces, means for circulating air through all of the spaces, means for cooling the circulated air, and means for heating the circulated air; a thermostat in each space for controlling the admission of a heating medium to the radiator for that space; a thermostat responsive to the temperature of the circulated air for controlling the admission of a heating medium to the means for heating said circulated air; a thermal switch responsive to the temperature of the circulated air; a relay controlled by the functioning of said thermal switch for controlling the operation of said air cooling means; auxiliary heaters for said last mentioned thermostat and said thermal switch; and means actuated by the functioning of each of the thermostats in said spaces and adapted in one position to direct heating current of predetermined value through both of said auxiliary heaters, whereby the said thermostat for controlling the means for heating the circulated air and the said thermal switch are influenced to function by the cumulative effects of the functioning of a plurality of said space thermostats.

11. In combination with means for altering the temperature of the air within a plurality of enclosed spaces including separate radiators for each of the spaces, means for circulating air through all of the spaces, means for cooling the circulated air, and means for heating the circulated air; a thermostat in each space for controlling the admission of a heating medium to the radiator for that space; a thermostat responsive to the temperature of the circulated air for controlling the admission of a heating medium to the means for heating said circulated air; a thermal switch responsive to the temperature of the circulated air; a relay controlled by the functioning of said thermal switch for controlling the operation of said air cooling means; auxiliary heaters for said last mentioned thermostat and said thermal switch; means actuated by the functioning of each of the thermostats in said spaces and adapted in one position to direct heating current of predetermined value through both of said auxiliary heaters, whereby the said thermostat for controlling the means for heating the circulated air and the said thermal switch are influenced to function by the cumulative effects of the functioning of a plurality of said space thermostats, and thermostatic means responsive to a predetermined outside temperature for making said thermal switch effective.

12. In combination with means for altering the temperature of the air within a plurality of enclosed spaces including separate radiators for each of the spaces, means for circulating air through all of the spaces, means for cooling the circulated air, and means for heating the circulated air; a thermostat in each space for controlling the admission of a heating medium to the radiator for that space; a thermostat responsive to the temperature of the circulated air for controlling the admission of a heating medium to the means for heating said circulated air; a thermal switch responsive to the temperature of the circulated air; a relay controlled by the functioning of said thermal switch for controlling the operation of said air cooling means; auxiliary heaters for said last mentioned thermostat and said thermal switch; means actuated by the functioning of each of the thermostats in said spaces and adapted in one position to direct heating current of predetermined value through both of said auxiliary heaters, whereby the said thermostat for controlling the means for heating the circulated air and the said thermal switch are influenced to function by the cumulative effects of the functioning of a plurality of said space thermostats, thermostatic means responsive to a predetermined outside temperature for making said thermal switch effective, and means including an electric circuit closed by the functioning of said thermal switch for rendering the means for heating the circulated air ineffective.

13. In combination with means for altering the temperature of the air within a plurality of enclosed spaces including separate radiators for each of the spaces, means for circulating air through all of the spaces, means for cooling the circulated air, and means for heating the circulated air; a thermostat in each space for controlling the admission of a heating medium to the radiator for that space; a thermostat responsive to the temperature of the circulated air for controlling the admission of a heating medium to the means for heating said circulated air; a thermal switch responsive to the temperature of the circulated air; a relay controlled by the functioning of said thermal switch for controlling the operation of said air cooling means; auxiliary heaters for said last mentioned thermostat and said thermal switch; a relay controlled by the functioning of said last mentioned thermostat and adapted in one position to close additional heating circuits through said auxiliary heaters; means actuated by the functioning of each of the thermostats in said spaces and adapted in one position to direct heating current of predetermined value through both of said auxiliary heaters, whereby the said thermostat for controlling the means for heating the circulated air and the said thermal switch are influenced to function by the cumulative effects of the functioning of a plurality of said space thermostats, thermostatic means responsive to a predetermined outside temperature for making said thermal switch effective, and means including an electric circuit closed by the functioning of said thermal switch for rendering the means for heating the circulated air ineffective.

14. In combination with means for altering the temperature of the air within a plurality of enclosed spaces including separate radiators for each of the spaces, means for circulating air through all of the spaces, means for cooling the circulated air, and means for heating the circulated air; a thermostat in each space for controlling the admission of a heating medium to the radiator for that space; a thermostat responsive to the temperature of the circulated air for controlling the admission of a heating medium to the means for heating said circulated air; a thermal switch responsive to the temperature of the circulated air; a relay controlled by the functioning of said thermal switch for controlling the operation of said air cooling means; auxiliary heaters for said last mentioned thermostat and said thermal switch; a relay controlled by the functioning of said last mentioned thermostat and adapted, when the said last mentioned thermostat calls for heat, to close additional heating circuits through said auxiliary heaters; means actuated by the functioning of each of the thermostats in said spaces and adapted in one position to direct heating current of predetermined value through both of said auxiliary heaters, whereby the said thermostat for controlling the means for heating the circulated air and the said thermal switch are influenced to function by the cumulative effects of the functioning of a plurality of said space thermostats, thermostatic means responsive to a predetermined outside temperature for making said thermal switch effective, and means including an electric circuit closed by the functioning of said thermal switch for rendering the means for heating the circulated air ineffective.

15. In apparatus for controlling the temperature of a plurality of spaces comprising means for circulating air through said spaces collectively, means for cooling the air stream preliminary to its introduction into the said spaces, means for reheating the air to a desired temperature comprising separate primary heaters for the several spaces, secondary heaters for adding heat to the air stream before it enters the spaces, means including a thermostat responsive to changes in temperature of the air stream and having an auxiliary heater for varying its functioning temperatures, separate means for automatically controlling the operation of the several primary heaters including a room thermostat for each of the several spaces, a relay actuated by said room thermostat for directing additional current to the said auxiliary heater and thereby lower the functioning temperature of said duct thermostat, and means including an auxiliary heater and a manually variable resistance associated with the room thermostat for varying the reheating effect of the primary heaters on the air introduced into the several spaces.

16. In apparatus for controlling the temperature of a plurality of spaces comprising means for circulating air through said spaces collectively, means for cooling the air stream preliminary to its introduction into the said spaces, means for reheating the air to a desired temperature comprising separate primary heaters for the several spaces, secondary heaters for adding heat to the air stream before it enters the spaces, means including a thermostat responsive to changes in temperature of the air stream and having an auxiliary heater for varying its functioning temperatures, separate means for automatically controlling the operation of the several primary heaters including a room thermostat for each of the several spaces, a relay actuated by said room thermostat for directing additional current to the said auxiliary heater and thereby lower the functioning temperature of said duct thermostat, means including an auxiliary heater and a manually variable resistance associated with the room thermostat for varying the reheating effect of the primary heaters on the air introduced into the several spaces, and means responsive to a predetermined air temperature for rendering the secondary heaters ineffective.

17. In combination with means for altering the temperature of the air within a plurality of enclosed spaces arranged in different control groups and including separate radiators for each of said spaces, means for circulating air through all of said spaces and means for separately heating the circulated air for the separate groups of spaces, a thermostat in each of said spaces for controlling the radiator associated therewith; a thermostat for each group of spaces for controlling the separate means for heating the air circulated through the different groups of spaces; an auxiliary heater for the last mentioned thermostat, and means actuated by the functioning of the first mentioned thermostat and adapted in one position thereof to close a plurality of parallel heating circuits through the auxiliary heater of the last mentioned thermostat, whereby said last mentioned thermostat is adjusted to function at a lower temperature of said air.

18. In combination with means for altering the temperature of the air within a plurality of enclosed spaces arranged in different control groups and including separate radiators for each of said spaces, means for circulating air through all said spaces, means for separately cooling the air for the separate groups of spaces, and means for separately heating the circulated air for the separate groups of spaces; a thermostat for each of said spaces for controlling the radiator associated therewith; a thermostat for each group of spaces responsive to the temperature of the circulated air for controlling the separate means for heating the air circulated through the different groups of spaces; a thermal switch having a plurality of contacts adapted to be closed at different temperatures; a relay controlled by an electric circuit leading from one contact of said thermal switch to make the cooling means effective; auxiliary heaters for the last mentioned thermostat and said thermal switch; and relays actuated by the functioning of each of the space thermostats and adapted in one position to close a heating circuit through both auxiliary heaters whereby the functioning of said thermostat for the air heating means and the functioning of said thermal switch are influenced by the collective effect of the functioning of a plurality of said space thermostats.

19. In combination with means for altering the temperature of the air within a plurality of enclosed spaces arranged in different control groups and including separate radiators for each of said spaces, means for circulating air through all said spaces, means for separately cooling the air for the separate groups of spaces, and means for separately heating the circulated air for the separate groups of spaces; a thermostat for each of said spaces for controlling the radiator associated therewith; a thermostat for each group of spaces responsive to the temperature of the circulated air for controlling the separate means for heating the air circulated through the different groups of spaces; a thermal switch having a plurality of contacts adapted to be closed at different temperatures; a relay controlled by an electric circuit leading from one contact of said thermal switch to make the cooling means effective; auxiliary heaters for the last mentioned thermostat and said thermal switch; relays actuated by the functioning of each of the space thermostats and adapted in one position to close a heating circuit through both auxiliary heaters whereby the functioning of said thermostat for the air heating means and the functioning of said thermal switch are influenced by the collective effect of the functioning of a plurality of said space thermostats; and a circuit closed through another contact of said thermal switch for rendering the heating means of the circulated air ineffective.

20. In combination with means for altering the temperature of the air within a plurality of enclosed spaces including separate radiators for each of the spaces, means for circulating air through all of the spaces, means for cooling the circulated air, and means for heating the circulated air; a thermostat in each space for controlling the admission of a heating medium to the radiator for that space; a thermostat responsive to the temperature of the circulated air for controlling the admission of a heating medium to the means for heating said circulated air; a pair of thermal switches responsive to the temperature of the circulated air set to function at different temperatures, a relay controlled by the functioning of the lower temperature thermal switch for controlling the operation of the air cooling means, a circuit controlled by the higher temperature thermal switch for rendering the last mentioned thermostat ineffective, auxiliary heaters for the last mentioned thermostat and said thermal switches connected in parallel with each other; and means actuated by the functioning of each of the thermostats in said spaces and adapted in one position to direct heating current of predetermined value through all three of said auxiliary heaters, whereby the said thermostat for controlling the means for heating the circulated air and the said thermal switches are influenced to function by the cumulative effects of the functioning of a plurality of said space thermostats.

21. In apparatus for controlling the temperature of a plurality of spaces comprising means for circulating air through said spaces collectively, means for cooling the air stream preliminary to its introduction into the said spaces, means for reheating the air to a desired temperature comprising separate primary heaters for the several spaces, secondary heaters for adding heat to the air stream before it enters the spaces, means including a thermostat responsive to changes in temperature of the air stream and having an auxiliary heater for varying its functioning temperatures, a pair of thermal switches responsive to the temperature of the circulated air and set to function at different temperatures, auxiliary heaters for each of the thermal switches connected in parallel with each other and with the auxiliary heater for the air temperature responsive thermostat, a relay actuated by the functioning of a lower temperature thermal switch for energizing the cooling apparatus, a circuit closed by the functioning of the higher temperature thermal switch for rendering ineffective the thermostat which responds to the temperature of the air stream, and means for automatically controlling the operation of the several primary heaters including a room thermostat for each of the several spaces, a relay actuated by said room thermostat for directing additional current to the auxiliary heater of the air temperature responsive thermostat and to the auxiliary heaters of both thermal switches whereby the functioning temperature of said duct thermostat is lowered and the functioning of the thermal switches is influenced by the collective action of the room thermostats.

22. In combination with means for altering the temperature of the air within a plurality of enclosed spaces including means for circulating air through all said spaces, means for adding heat to the circulated air, a thermostat in each space responsive to the temperature therein and adapted to function at a predetermined temperature, a thermostat responsive to the temperature of the circulated air as a whole and provided with an auxiliary electrical heater, means including an electric circuit closed by the functioning of the last mentioned thermostat to control the operation of the temperature altering means, and means actuated by the functioning of each of the thermostats in said spaces and adapted in one position to direct heating current of predetermined value through said auxiliary heater, whereby the said thermostat for controlling the temperature altering means is influenced to function by the cumulative effects of the functioning of a plurality of said space thermostats.

23. In combination with means for altering the temperature of the air within a plurality of enclosed spaces including means for circulating air through all said spaces, means for cooling the circulated air, a thermostat in each space responsive to the temperature therein and adapted to function at a predetermined temperature, a thermal switch responsive to the temperature of the circulated air as a whole and provided with an auxiliary heater, means including an electric circuit closed by the functioning of the thermal switch to control the operation of the temperature altering means, and means actuated by the functioning of each of the thermostats in said spaces and adapted in one position to direct heating current of predetermined value through said auxiliary heater, whereby the said thermal switch for controlling the temperature altering means is influenced to function by the cumulative effects of the functioning of a plurality of said space thermostats.

TIMOTHY J. LEHANE.
EVERETT H. BURGESS.

REFERENCES CITED

The following references are of record in the file of this patent:

UNITED STATES PATENTS

| Number | Name | Date |
| --- | --- | --- |
| 2,168,178 | Thompson | Aug. 1, 1939 |
| 2,170,072 | Hartig | Aug. 22, 1939 |
| 2,234,288 | Smith et al. | Mar. 11, 1941 |
| 2,323,236 | Parks et al. | June 29, 1943 |